(12) United States Patent
Hsieh et al.

(10) Patent No.: US 12,288,000 B2
(45) Date of Patent: Apr. 29, 2025

(54) ELECTRONIC DEVICE CAPABLE OF VISUALIZING RANDOMNESS OF RANDOM NUMBERS

(71) Applicant: PUFsecurity CORPORATION, Zhubei (TW)

(72) Inventors: Tsung-Han Hsieh, Hsinchu County (TW); Kai-Hsin Chuang, Hsinchu County (TW)

(73) Assignee: PUFSECURITY CORPORATION, Hsinchu County (TW)

( * ) Notice: Subject to any disclaimer, the term of this patent is extended or adjusted under 35 U.S.C. 154(b) by 0 days.

(21) Appl. No.: 18/666,052

(22) Filed: May 16, 2024

(65) Prior Publication Data
US 2025/0085913 A1 Mar. 13, 2025

Related U.S. Application Data

(60) Provisional application No. 63/537,205, filed on Sep. 8, 2023.

(51) Int. Cl.
*G06F 3/14* (2006.01)
*G06F 7/58* (2006.01)

(52) U.S. Cl.
CPC ............... *G06F 3/14* (2013.01); *G06F 7/588* (2013.01)

(58) Field of Classification Search
CPC .................................. G06F 3/14; G06F 7/588
See application file for complete search history.

(56) References Cited

U.S. PATENT DOCUMENTS

2017/0033868 A1* 2/2017 Hong .................. H04B 10/116

OTHER PUBLICATIONS

Fukuda, S., Hoggatt, J., Singh, P., Abe, M., Speth, J. M., Hu, P., Conway, E. M., Nucifora, G., Yamaguchi, S., & Pelus, L. M. (2014). Survivin modulates genes with divergent molecular functions and regulates proliferation of hematopoietic stem cells through Evi-1. Leukemia, 29(2), 433-440. https://doi.org/10.1038/leu.2014.183.
Lochel, H. F., & Heider, D. (2021). Chaos game representation and its applications in bioinformatics. Computational and Structural Biotechnology Journal, 19, 6263-6271. https://doi.org/10.1016/j.csbj.2021.11.008.

* cited by examiner

*Primary Examiner* — Abbas I Abdulselam
(74) *Attorney, Agent, or Firm* — WPAT, P.C.; Anthony King

(57) ABSTRACT

An electronic device includes a processor, a memory, and at least one program. The at least one program are stored in the memory and are executed by the processor. The at least one program includes instructions for receiving the sequence of bits, dividing the sequence of bits into binary numbers having a same number of bits, determining a corresponding point for each binary number on a circumference of a circle according to a central angle positively correlated to a value of each binary numbers, plotting chords connecting corresponding points of two succeeding binary numbers in the circle in the display image, and displaying the display image to show a brightness of each chord correlated to a number of times the chord is plotted, wherein the brightness of each chord forms a brightness distribution signifying an entropy of the first sequence of bits.

20 Claims, 8 Drawing Sheets

ELECTRONIC DEVICE CAPABLE OF VISUALIZING RANDOMNESS OF RANDOM NUMBERS

CROSS REFERENCE

This application claims the benefit of prior-filed U.S. provisional application No. 63/537,205, filed on Sep. 8, 2023, which is incorporated by reference in its entirety.

TECHNICAL FIELD

The present disclosure relates to an electronic device, and more particularly, to an electronic device capable of visualizing randomness of random numbers.

DISCUSSION OF THE BACKGROUND

As computing power of electronic devices continues to grow, information security has become an increasingly important issue. The random number generator is one of the commonly used tools in information security. Ideally, a random number generator should be able to generate unpredictable random strings, which can be used as a seed to generate encryption keys and enhance the security of data transmission. However, random numbers generated by computers often still exhibit certain patterns, making it difficult to provide sufficient security.

To ensure randomness of random numbers, researchers have developed some true random number generators (TRNG) that utilize physical characteristics to generate random numbers. For example, for an inverter composed of semiconductor transistors, the speed at which the voltage changes in response to the input voltage change is unpredictable, and such unpredictability becomes even more obvious when the inverters are connected to form a ring oscillator. Therefore, the random numbers can be generated by periodically sampling the output signals of the ring oscillator.

After the random numbers are generated, it is also important to further confirm the randomness of the random number, that is, the quality of the random number. To evaluate the randomness, or the entropy, of a random string, the National Institute of Standards and Technology (NIST) SP800-90B defines various methods, such as collision estimation, t-Tuple estimation, and longest repeated substring estimation, to estimate the entropies of the random numbers. However, these evaluation methods may require a large amount of computation and cannot present a visually perceive result for people. Therefore, how to simplify the computation while visually presenting the randomness of the random numbers has become a challenge in this field.

SUMMARY

One aspect of the present disclosure provides an electronic device. The electronic device includes a processor, a memory, and at least one program. The at least one program is stored in the memory and configured to be executed by the processor. The at least one program includes instructions for receiving a sequence of bits, dividing the sequence of bits into a plurality of binary numbers having a same number of bits, and determining a corresponding point for each of the plurality of binary numbers on a circumference of a circle according to a central angle positively correlated to a value of each of the plurality of binary numbers, wherein corresponding points of binary numbers having different values are located differently. The at least one program further includes instructions for plotting a plurality of chords in the circle in a display image, wherein each of the plurality of chords connects corresponding points of two succeeding binary numbers in the plurality of binary numbers, and displaying the first display image to show a brightness of each chord of the plurality of chords correlated to a number of times the chord is plotted, wherein the brightness of each chord of the plurality of chords forms a brightness distribution signifying an entropy of the first sequence of bits.

Another aspect of the present disclosure provides an electronic device. The electronic device includes a data processing unit and a display device. The data processing unit receives a sequence of bits from the memory, divides the sequence of bits into a plurality of binary numbers having a same number of bits, and determines a corresponding point for each of the plurality of binary numbers on a circumference of a circle according to a central angle positively correlated to a value of each of the plurality of binary numbers, wherein corresponding points of binary numbers having different values are located differently. The data processing unit further plots a plurality of chords in the circle in a display image, wherein each of the plurality of chords connects corresponding points of two succeeding binary numbers in the plurality of binary numbers, and displays the first display image to show a brightness of each chord of the plurality of chords correlated to a number of times the chord is plotted, wherein the brightness of each chord of the plurality of chords forms a brightness distribution signifying an entropy of the first sequence of bits.

Another aspect of the present disclosure provides a method for visualizing an entropy of a sequence of bits. The method includes receiving a sequence of bits, dividing the sequence of bits into a plurality of binary numbers having a same number of bits, and determining a corresponding point for each of the plurality of binary numbers on a circumference of a circle according to a central angle positively correlated to a value of each of the plurality of binary numbers, wherein corresponding points of binary numbers having different values are located differently. The method further includes plotting a plurality of chords in the circle in a display image, wherein each of the plurality of chords connects corresponding points of two succeeding binary numbers in the plurality of binary numbers, and displaying the first display image to show a brightness of each chord of the plurality of chords correlated to a number of times the chord is plotted, wherein the brightness of each chord of the plurality of chords forms a brightness distribution signifying an entropy of the first sequence of bits.

BRIEF DESCRIPTION OF THE PLOTTINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
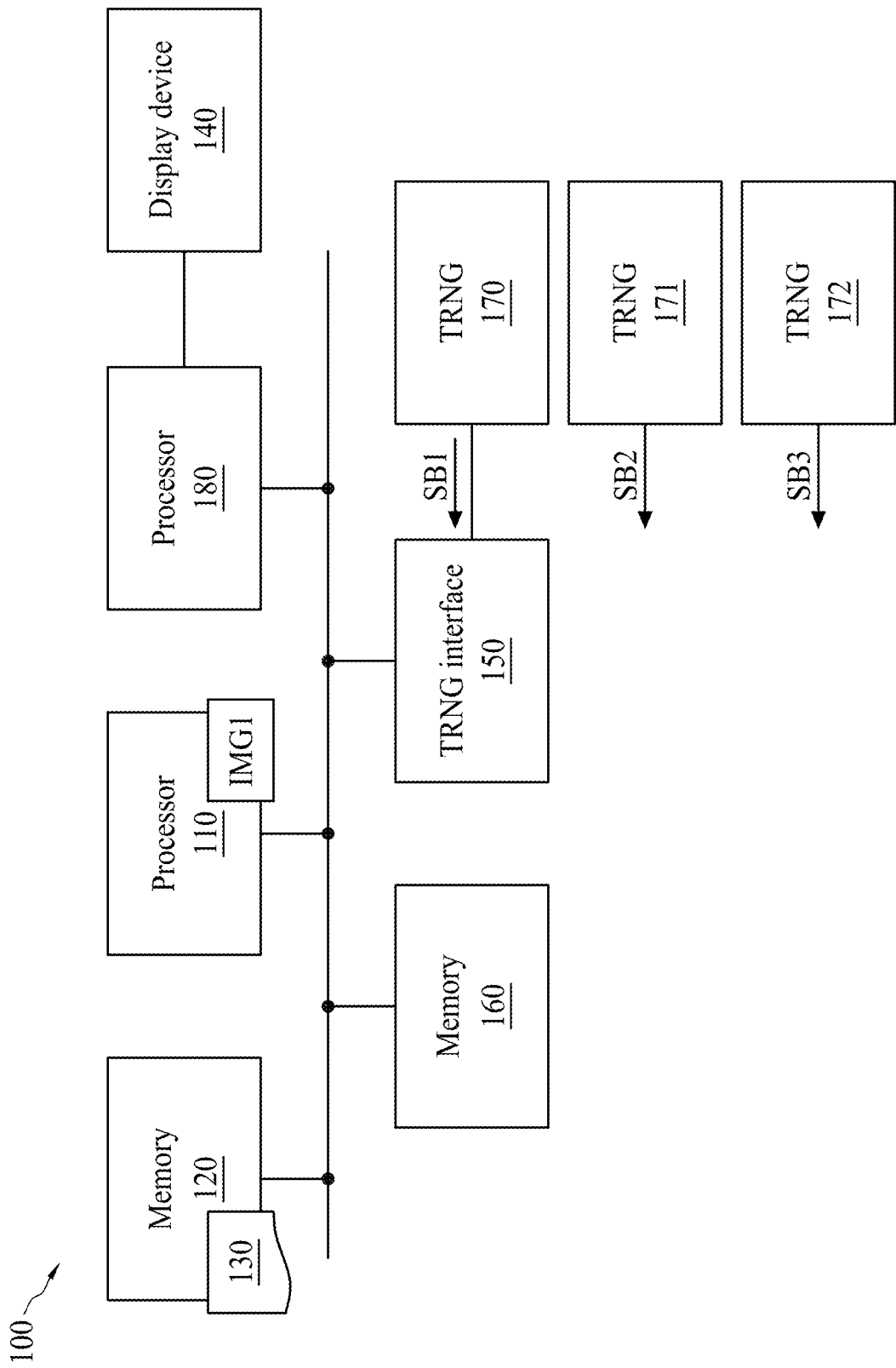
FIG. 1 shows an electronic device according to one embodiment of the present disclosure.

FIG. 1 shows an electronic device 100 according to one embodiment of the present disclosure. The electronic device 100 includes a processor 110, a memory 120, and at least one program 130. In the present embodiment, the program 130 can be stored in the memory 120, and the processor 110 can execute the program 130 to receive a sequence of bits SB1 and generate a display image IMG1 according to the sequence of bits SB1. In the present embodiment, the entropy (i.e., the randomness) of the sequence of bits SB1 can be visualized through the display image IMG1, and the electronic device 100 may further include a display device 140 for displaying the display image IMG1.

In the present embodiment, the processor 110 can divide the sequence of bits SB1 into a plurality of binary numbers that have a same number of bits. Then, the processor 110 can further locate corresponding points of the binary numbers on a circumference of a circle according their values so that corresponding points of binary numbers having different values can locate differently and evenly on the circumference. Finally, the processor 110 can plot chords in the circle in the display image IMG1 with each chords connecting two corresponding points of two adjacent binary numbers in the sequence of bits SB1. In such case, each chord can be seen as a transition between one binary number to a succeeding binary number. In the present embodiments, a brightness of each chord can further be determined according to a number of times that the chord is plotted. For example, a chord that has been plotted more number of times may be brighter than that of a chord that has been plotted less number of times.

As a result, by observing the distribution of the chords and the brightness of the chords in the display image IMG1, the distribution of the binary numbers and the patterns existed in the binary number transitions can be observed. In such case, if some of the chords are obviously brighter than the others, it may indicate that there is a certain pattern existed in the sequence of bits SB1, and thus, the sequence of bits SB1 can be expected to have a lower entropy. On the contrary, if the chords are distributed evenly with no chord standing out in terms of brightness, then it may imply that there is no obvious pattern within the sequence of bits SB1, and thus, the sequence of bits SB1 can be expected to have a higher entropy. That is, the entropy of the sequence o bits SB1 can be visually observed by the display image randomness IMG1.

Figure 2:
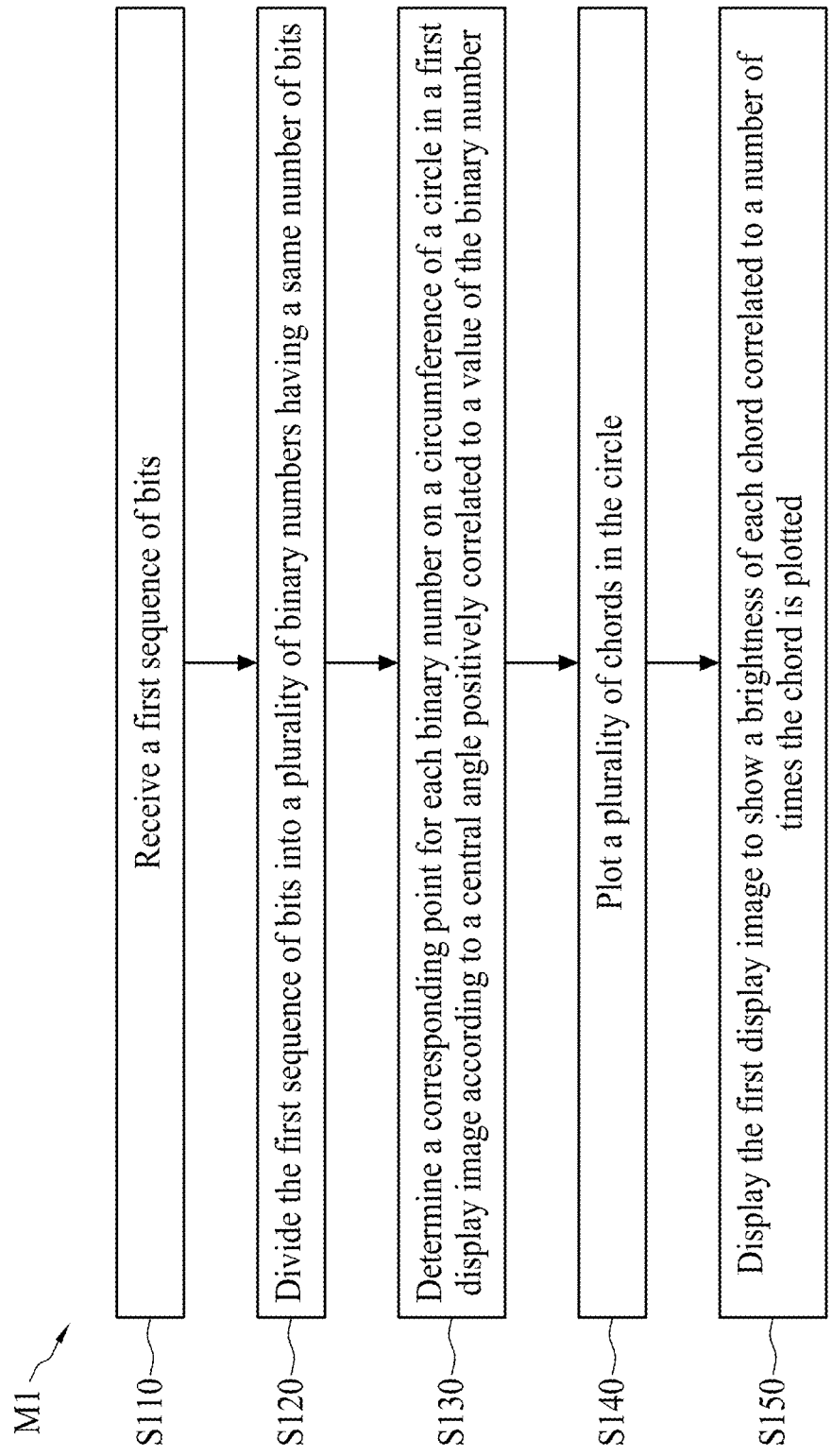
FIG. 2 shows a method for visualizing an entropy of the sequence of bits according to one embodiment of the present disclosure.

FIG. 2 shows a method M1 for visualizing an entropy of the sequence of bits SB1 according to one embodiment of the present disclosure. In some embodiments, the method M1 can be performed by the electronic device 100. The method M1 includes steps S110 to S150. In some embodiments, the steps S110 to S150 can be implemented as program codes in the program 130, and the processor 110 may execute the program 130 for performing the method M1. The processor 110 may be a general purpose processor such as a central processing unit (CPU), a micro controller, a digital signal processor (DSP), a graphics processing unit (GPU), or other suitable processing unit that is able to execute the program 130.

In step S110, the processor 110 can execute the program 130 to receive the sequence of bits SB1. In some embodiments, the sequence of bits SB1 can be generated by a true random number generator (TRNG) 170, and the electronic device 100 may further include a TRNG interface 150. In some embodiments, the TRNG interface 150 and the TRNG 170 may have specialized communication ports or regular communication ports, such as Serial Parallel Interface (SPI) ports, so that the TRNG interface 150 can receive the sequence of bits SB1 from the TRNG 170. In some embodiments, the TRNG 170 can generate the sequence of bits SB1 through a physical process that includes unpredictability. For example, the TRNG 170 may include a ring oscillator formed by connecting a plurality of inverters. Since the jitter caused by each inverter is unpredictable, the toggling timing of the ring oscillator is also unpredictable. Therefore, the TRNG 170 may generate the sequence of bits SB1 by periodically sampling the output of the ring oscillator. However, the present disclosure is not limited thereto. In some other embodiments, the TRNG 170 may generate the random bit sequence, that is, the sequence of bits SB1, by utilizing other unpredictable physical phenomenon, such as thermal noise, photoelectric effects, and quantum phenomenon.

In addition, the electronic device 100 may further include another memory 160, and the TRNG interface 150 may include communication ports for accessing the memory 160 so that the TRNG interface 150 can store the received sequence of bits SB1 to the memory 160 sequentially. That is, the TRNG interface 150 can be interfacing between the external TRNG 170 and the memory 160. In such case, the processor 110 can retrieve the sequence of bits SB1 from the memory 160 through a regular memory access scheme when performing step S110. In some embodiments, the processor 110, the TRNG interface 150, the memory 120, and the memory 160 can be coupled through a system bus. However, the present embodiment is not limited thereto. In some embodiments, memory 120 and 160 can be two separate and distinct memories, or memory 120 and 160 can be different address spaces of the same memory.

In some embodiments, the processor 110 may have a SPI or other interface that can communicate with the TRNG 170 directly without requiring the TRNG interface 150. Furthermore, in some embodiments, the TRNG 170 may be included within the electronic device 100. However, in some embodiments, the TRNG 170 can be external to the electronic device 100, and the electronic device 100 may be switched to couple to other TRNG, such as TRNGs 171 and 172, so as to visualize the entropy of the sequence of bits that generated by the TRNGs 171 and 172.

Furthermore, in some embodiments, the memory 120 may be a non-volatile memory so that the program 130 can be stored stably even when the electronic device 100 is powered off. For example, the memory 120 may be a flash memory. Also, the memory 160 may be a random access memory (RAM), such as a dynamic random access memory (DRAM) or a static random access memory (SRAM).

In step S120, the processor 110 can divide the sequence of bits SB1 into a plurality of binary numbers BN_1 to BN_X with each of binary numbers BN_1 to BN_X having M bits, where X and M are integers greater than 1. In such case, each of the binary numbers BN_1 to BN_X has a value from 0 to $2^M-1$.

Figure 3:
FIG. 3 shows how the sequence of bits is divided in to the binary numbers.

FIG. 3 shows how the sequence of bits SB1 is divided into the binary numbers BN_1 to BN_X. In the embodiment shown in FIG. 3, M equals to 3, and the sequence of bits SB1 can be sequentially divided into the binary numbers BN_1 to BN_X. For example, the first 3 bits in the sequence of bits SB1 is grouped as the first binary number BN_1 having a value of 0 (i.e., "000"), the second 3 bits in the sequence of bits SB1 is grouped as the second binary number BN_2 having a value of 3 (i.e., "011"), and so on. In such case, each of the binary numbers BN_1 to BN_X has a value of 0 (i.e., "000"), 1 (i.e., "001"), 2 (i.e., "010"), 3 (i.e., "011"), 4 (i.e., "100"), 5 (i.e., "101"), 6 (i.e., "110"), or 7 (i.e., "111").

Next, to visualize the patterns existed in the binary numbers BN_1 to BN_X, in step S130, the processor 110 can determine a corresponding point for each of the binary numbers BN_1 to BN_X on a circumference of a circle according to a central angle positively correlated to a value of each of the binary numbers BN_1 to BN_X so that corresponding points of binary numbers having different values will be located differently and evenly on the circumference of the circle.

Figure 4:
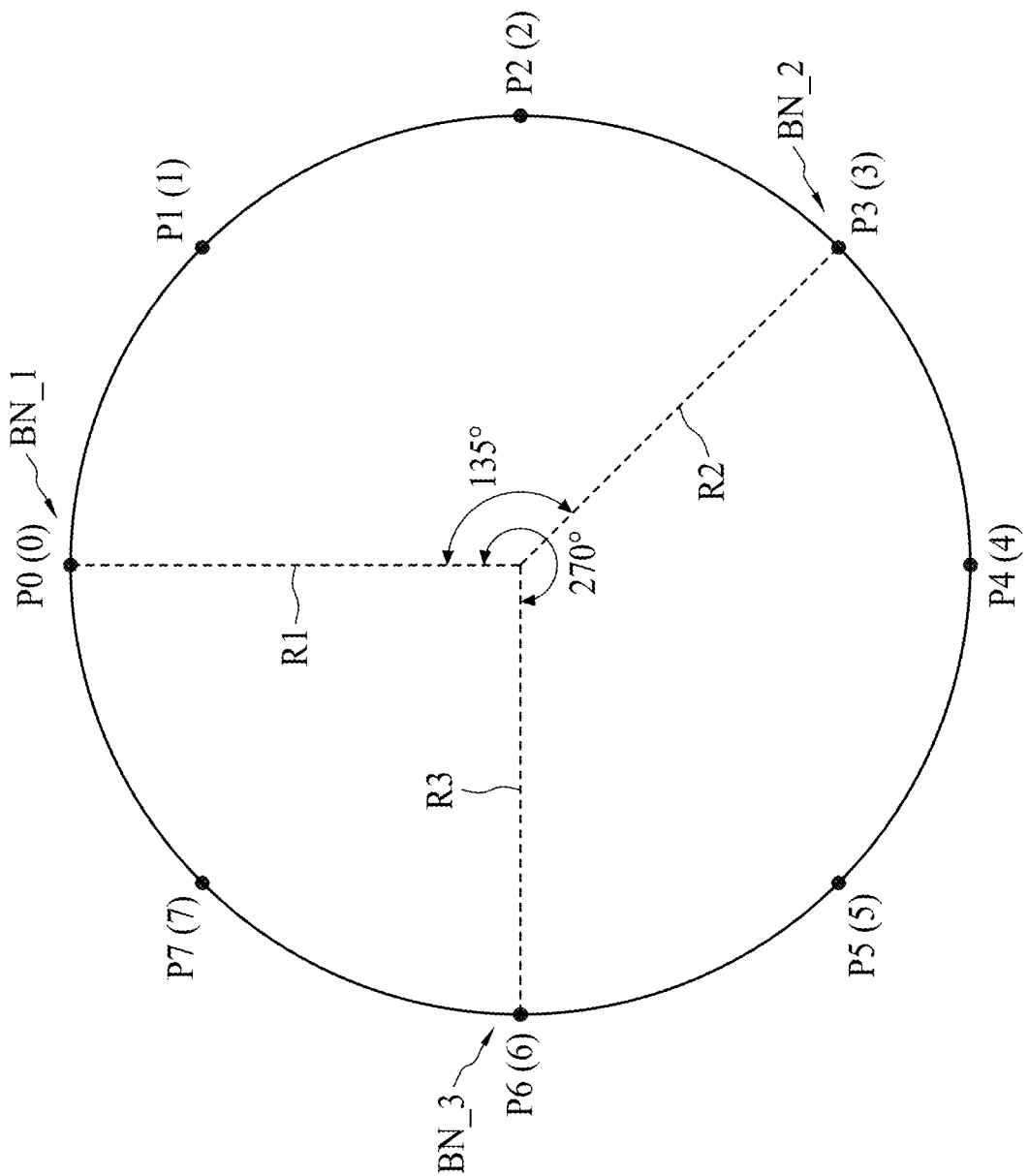
FIG. 4 shows the corresponding points of the binary numbers on the circumference of the circle.

FIG. 4 shows the corresponding points of the binary numbers BN_1 to BN_3 on the circumference of the circle C1. As shown in FIG. 4, corresponding points of binary numbers having values of 0 to 7 can be locate at positions P0, P1, P2, P3, P4, P5, P6, and P7 respectively while the positions P0, P1, P2, P3, P4, P5, P6, and P7 are evenly distributed on the circumference of the circle C1. In the present embodiment, if the binary number BN_1 has a value of 0 and the binary number BN_2 has a value k, wherein k is an integer in a range of 0 to 7, then a degree of the central angle formed by a radius R1 connecting to the corresponding point of the binary number BN_1 and a radius R2 connecting to the corresponding point of the binary number BN_2 would be equal to $$\frac{k}{2^M} \times 360°.$$

For example, if k equals to 3 and M equals to 3, then the corresponding point of the binary number BN_2 will be located at the point P3, the degree of the central angle between the radii R1 and R2 would be 135°

$$\left(i.e., \frac{3}{8} \times 360°\right).$$

Similarly, if the binary number BN_3 has a value 6, then the corresponding point of the binary number BN_3 will be located at the point P6, and a degree of a central angle formed by the radius R1 and the radius R3 connecting to the corresponding point of the binary number BN_3 would be 270°

$$\left(i.e., \frac{6}{8} \times 360°\right).$$

Figure 5:
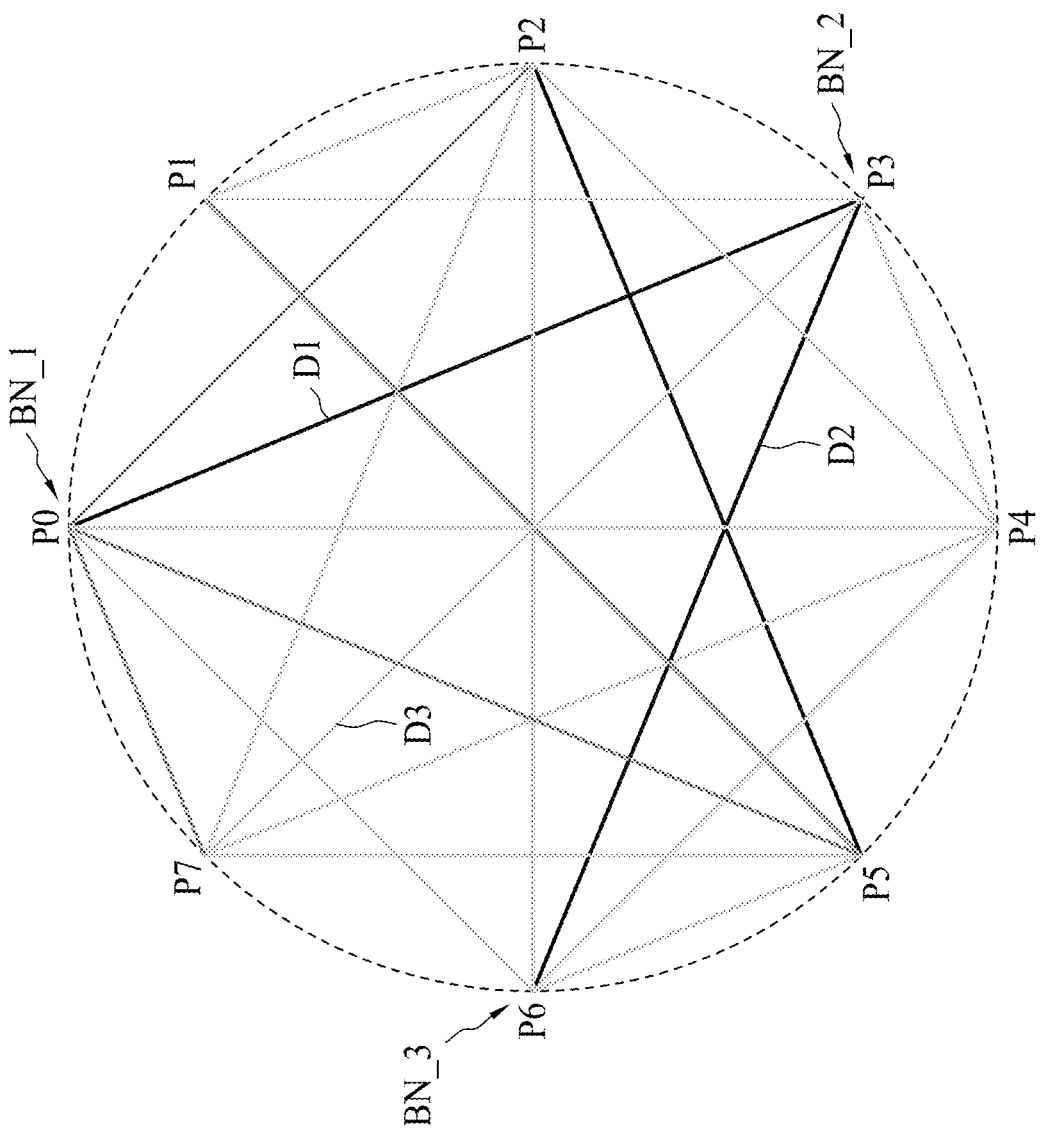
FIG. 5 shows a display image according to one embodiment of the present disclosure.

After the corresponding points of the binary numbers BN_1 to BN_X are located, the processor 110 can, in step S140, further plotting a plurality of chords in the circle C1 in the display image IMG1 with each of the chords connecting corresponding points of two succeeding binary numbers. FIG. 5 shows the display image IMG1 according to one embodiment of the present disclosure. As shown in the display image IMG1, the processor 110 can plot a chord D1 by connecting the corresponding points of the binary number BN_1 and the binary number BN_2, plot a chord D2 by connecting the corresponding points of the binary number BN_2 and the binary number BN_3, and so on. In such case, each chord can be seen as a transition between one binary number to a subsequent binary number.

In some cases, some transitions may occur more frequently than the others, which means that a predictable pattern may exist in the sequence of bits SB1, and thus, the entropy of the sequence of bits SB1 may be comparatively low. For example, due to the characteristics of the TRNG 170, a sequence of "000" may usually lead to a following sequence of "011", and a sequence of "011" may usually lead to a following sequence of "110". In such case, the chord D1 and D2 may be plotted more times than the other chords are plotted. In the present embodiments, to visually present such pattern, the processor 110 may further determine a brightness of each chord according to a number of times the chord is plotted, so that, in step S150, the display image IMG1 can be displayed, for example, by controlling the display device 140, to show a brightness of each chord correlated to a number of times the chord is plotted. For example, as shown in FIG. 5, a chord that has been plotted more times will be assigned to have a lower brightness (i.e., blacker). That is, the brightness of the chords can be determined so as to visually present how frequently the chords have been plotted, and the brightness distribution formed by the brightness of the chords would signify an entropy of the first sequence of bits SB1.

For example, since the chord D1 has been plotted more times than the chord D3 has been plotted, a brightness assigned to the chord D1 can be lower than a brightness assigned to the chord D3. In some embodiments, the brightness of a chord may be negative correlated to a number of times that such chord has been plotted when the circle is presented in a high brightness state. However, the present disclosure is not limited thereto. Alternatively, a brightness of a chord may be positive correlated to a number of times that such chord has been plotted when the circle is presented in a low brightness state. That is, a chord that has been plotted more times may be assigned to have a greater brightness. In some embodiments, the brightness of a chord may be proportional to a number of times that such chord has been plotted. However, the present disclosure is not limited thereto. In addition, in some embodiments, instead of adopting brightness to distinguish the number of time of plotting, thickness may be adopted. For example, a chord that has been plotted more times may have a larger thickness than that of a chord that has been plotted less times.

In the present embodiment, the processor 110 may be a CPU, and the electronic device 100 may further include a processor 180 as a GPU. In such case, the processor 110 may request the GPU 180 to plot the chords on a canvas so as to generate the display image IMG1 and update the frame buffer according to the display image IMG1 so that the display device 140 can display the display image IMG1 in step S150 accordingly. In the present embodiment, the display device 140 may include a liquid crystal display (LCD) panel, an organic light-emitting diode (OLED) panel, a plasma display device (PDP), a projector or any other types of display device that is able to display images of different levels of brightness.

Furthermore, in some embodiments, the processor 110 may request the processor 180 to plot one chord in one image file at a time in step S140, and may have the processor 180 to overlay all the image files on a canvas. In such case, the brightness of the chords may be accumulated during the overlaying process, and the brightness of each chord in the display image IMG1 can be determined accordingly and displayed in step S150. However, the present disclosure is not limited thereto. In some embodiments, the processor 180 may be omitted, and the processor 110 may calculate the number of times that each chord has been plotted and assign a brightness to the chord accordingly.

In addition, in order to effectively determine the randomness of a random bit sequence generated by the TRNG 170, we may need to observe a sequence of bits that is sufficiently long, as some repeated patterns may only appear after a considerable interval. Therefore, in some embodiments, the TRNG 170 may continue to generate random bits, and thus, the sequence of bits may keep growing. In such case, the processor 110 may keep updating the display image to plot the chord connecting to the corresponding point of the newly received binary number, and the processor 180 may generate a video stream according to the updated display images so that the display device 140 can display the updated display image IMG1 as more chords are added. That is, the electronic device 100 may visualize the entropy of the sequence of bits as the sequence of bits grows, making it more convenient for people to monitor the quality of the random bits generated by the TRNG 170 in a long period.

In the present embodiment, to show the process of generating the display image IMG1 clearly, the sequence of bits SB1 is divided into binary numbers having only 3 bits. However, in such case, as the sequence of bits SB1 grows, the image IMG1 may not be able to visually present the randomness clearly since all the binary numbers are distributed on only 8 different values. In some embodiments, the sequence of bits SB1 can be divided into binary numbers that have more bits, such as 8 to 12 bits, depending on the length of the sequence of bits SB1 to be observed.

Figure 6:
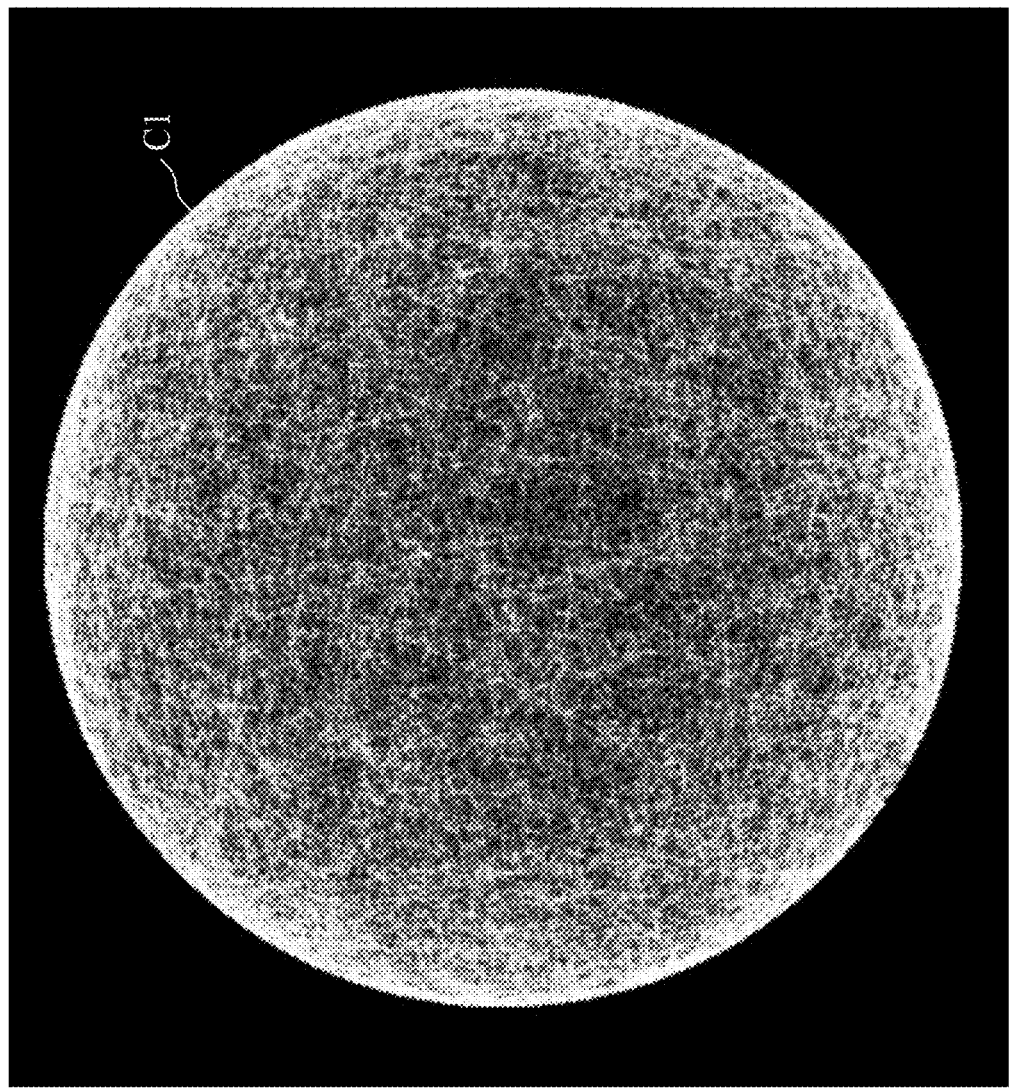
FIG. 6 shows a display image generated by the electronic device in FIG. 1 to show the entropy of a sequence of bit.
Figure 7:
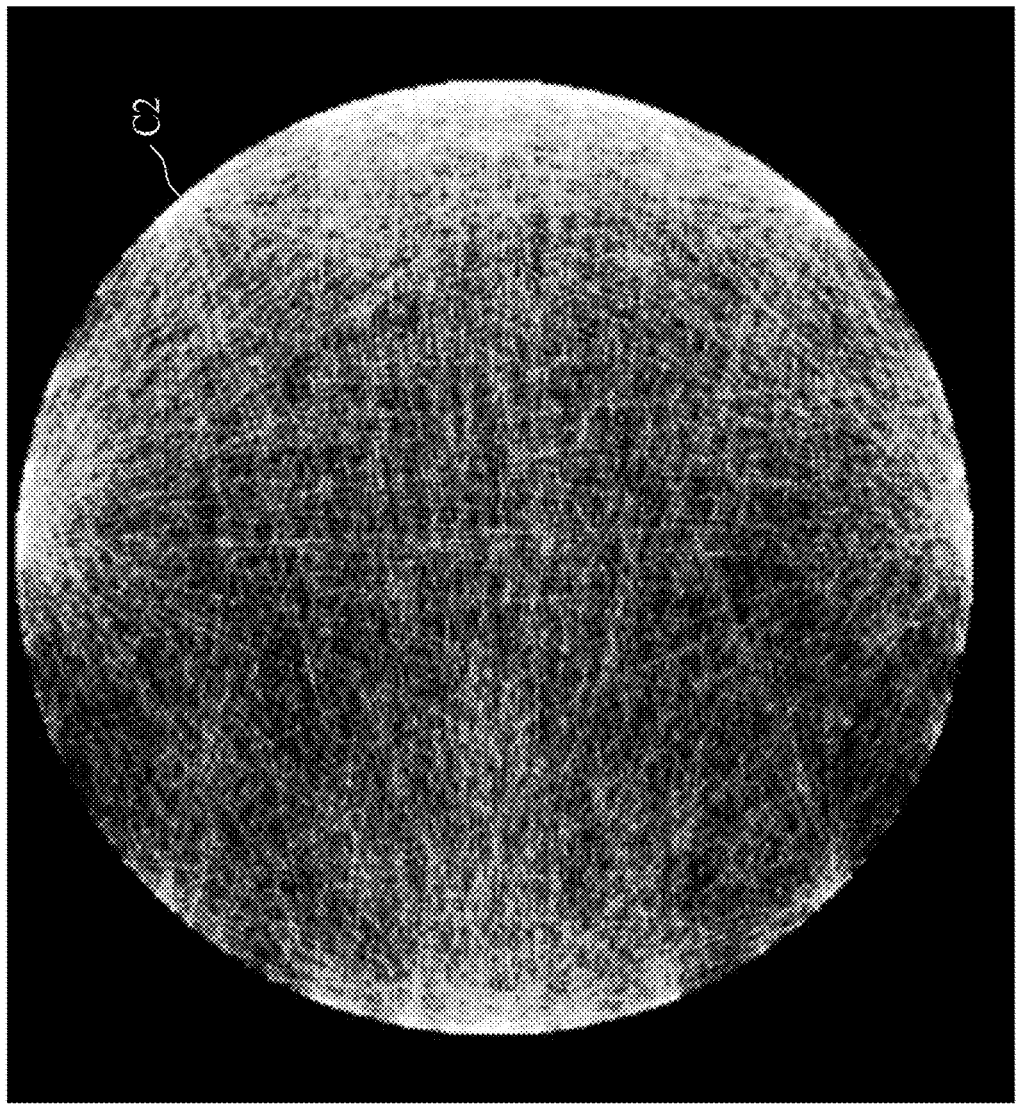
FIG. 7 shows another display image generated by the electronic device in FIG. 1 to show the entropy of another sequence of bit.

FIG. 6 shows a display image IMG2 generated by the electronic device 100 to show the entropy of a sequence of bit SB2 generated by one TRNG 171, and FIG. 7 shows a display image IMG3 generated by the electronic device 100 to show the entropy of a sequence of bit SB3 generated by another TRNG 172. In the present embodiment, the sequence of bits SB2 has a high entropy while the sequence of bits SB3 has a low entropy. Furthermore, in FIGS. 6 and 7, the circles C1 and C2 in the display image IMG2 and IMG3 are presented in a low brightness state (i.e., in black), and the chord in the circles have brightness positive correlated to the number of times the chord is plotted.

As shown in FIG. 6, the circumstance of the circle C1 has uniform brightness, which indicates that binary numbers derived from the sequence SB2 are evenly distributed to have different values. Also, brightness of the chords are similar with no obvious chords or shape standing out, which indicates that there's no obvious transition pattern existed in the binary numbers. However, since the entropy of the sequence of bits SB3 is lower than the entropy of the series of the bits SB2, the display image IMG3 presents more regular features than the display image IMG2 does. In some embodiments, the regular features may, for example, but not limited to, include asymmetry, patterns, shapes, and spots distributed unevenly.

In some embodiments, some of the regular features may be used to identify what are the predictable patterns existed in the sequence of bits. For example, in NIST SP800-90B, the collision estimate method is adopted to detect collisions in the random bit sequence. According to the definition, the collision occurs when two or more sequential random numbers are the same. However, in an ideal case, if a sequence of bits is random enough, such repeated patterns should be rarely observed. Therefore, if collision occur frequently, it would imply that the entropy of such sequence of bits is rather low.

In the display image IMG3, it may be noted that the right semicircle is brighter than the left semicircle, and such asymmetry feature may imply that the values of the binary number derived from the sequence of bits SB3 are not evenly distributed, and values of adjacent binary numbers may be confined within a rather small region. That is, binary numbers having a same value or similar values repeatedly show up, implying the occurrence of collision. Therefore, one may expect that the entropy of the sequence of bits SB3 estimated by collision estimation method would be rather low.

Furthermore, the NIST SP800-90B also includes the longest repeated substring (LRS) estimation to detect the longest repeated substrings in the random bit sequence so as to estimate the amount of redundancy or predictability in the random bit sequence. As shown in FIG. 7, the display image IMG3 also includes the regular features that shows obvious shapes (e.g., the triangles shown in the display image IMG3) formed by some of the frequently repeated chords. Such distinguishable shapes may imply that transitions among some values happen more frequently, and thus, there may be a repeated substring within the sequence of bits SB3. Therefore, one may expect that the entropy of the sequence of bits SB3 estimated by LRS estimation method would be rather low.

In some embodiments, by observing the display image generated by the electronic device 100 or the method M1, more types of predictabilities or regular patterns existed in the random bit sequence may be visually observed. For example, in addition to the predictabilities and the patterns that can be detected by the collision estimation and the LRS estimation, the predictabilities and the patterns that can be detected by the most common value estimation, the Markov estimation, the t-Tuple estimation, the lag prediction estimation, the multiMMC prediction estimation and the LZ78Y prediction estimation defined by NIST SP800-90B may also be visually observed from the display images generated by the electronic device 100 or the method M1.

That is, the electronic device 100 and the method M1 are able to generate display images that can visualize the entropy of a sequence of bits without involving complicated computations, so that people can compare the entropies of different sequence of bits intuitively by observing the corresponding display images.

Figure 8:
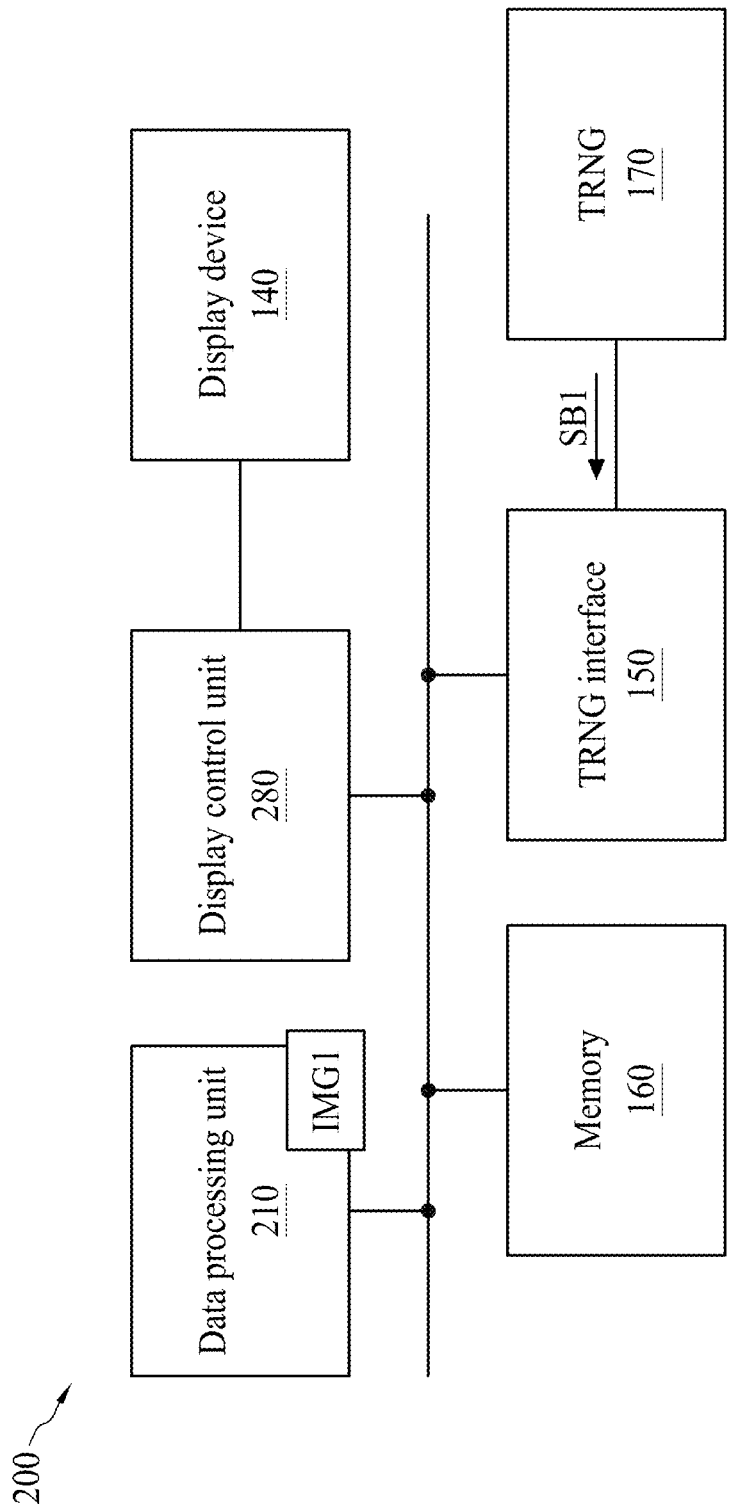
FIG. 8 shows an electronic device according to another embodiment of the present disclosure.

FIG. 8 shows an electronic device 200 according to another embodiment of the present disclosure. The electronic device 200 and the electronic device 100 have similar structure and can be operated according to similar principles. The electronic device 200 includes a data processing unit 210, a display device 140, a TRNG interface 150, and a memory 160.

In the present embodiment, the data processing unit 210 can be specifically designed to perform the method M1. That is, the data processing unit 210 can be a processor that dedicated to perform a built-in program that implements the method M1 or an application specific integrated circuit (ASIC) that can perform the steps of method M1 by its hardware logics for generating display images to visualize the entropies of sequences of random bits.

As shown in FIG. 8, the data processing unit 210 is coupled to the TRNG interface 150, the memory 160, and the display device 140. Furthermore, in the present embodiment, the data processing unit 210, the TRNG interface 150, and the memory 160 can be coupled through a system bus. However, the present disclosure is not limited. In some other embodiments, the data processing unit 210 may be coupled to the TRNG interface 150, and the memory 160 through other types of connection wires.

In the present embodiment, the TRNG interface 150 can receive the sequence of bits SB1 from the TRNG 170 and store the sequence of bits SB1 in the memory 160. Furthermore, the data processing unit 210 can receive the sequence of bits SB1 from the memory 160 and generate the display image IMG1 that can visualize the entropy of the sequence of the bits SB1. Finally, the display image IMG1 can be displayed through the display device 140. In some embodiments, the TRNG 170 may also be included in the electronic device 200.

Furthermore, in some embodiments, the electronic device 200 may further include a display control unit 280 that can update the frame buffer and control the display device 140 to display the display image IMG1 accordingly. However, the present disclosure is not limited thereto. In some embodiments, the data processing unit 210 may further be designed to control the display device 140 and the display control unit 208 may be omitted.

In summary, the electronic devices, and the methods provided by the embodiments of the present disclosure can visualize the entropy of a sequence of bits without complicated computation. Furthermore, with the electronic devices and the methods provided by the embodiments of the present disclosure, people can observe a variety of types of predictability and patterns existed in the sequence of bits visually, thereby observing the quality of the random sequence intuitively.

Although the present disclosure and its advantages have been described in detail, it should be understood that various changes, substitutions and alterations can be made herein without departing from the spirit and scope of the disclosure as defined by the appended claims. For example, many of the operations discussed above can be implemented in different methodologies and replaced by other operations, or a combination thereof.

What is claimed is:

1. An electronic device, comprising:
a processor;
a first memory; and
at least one program stored in the first memory and configured to be executed by the processor;
wherein the at least one program comprises instructions for:
receiving a first sequence of bits;
dividing the first sequence of bits into a plurality of binary numbers having a same number of bits;
determining a corresponding point for each of the plurality of binary numbers on a circumference of a circle according to a central angle positively correlated to a value of each of the plurality of binary numbers, wherein corresponding points of binary numbers having different values are located differently;
plotting a plurality of chords in the circle in a first display image, wherein each of the plurality of chords connects corresponding points of two succeeding binary numbers in the plurality of binary numbers; and
displaying the first display image to show a brightness of each chord of the plurality of chords correlated to a number of times the chord is plotted, wherein the brightness of each chord of the plurality of chords forms a brightness distribution signifying an entropy of the first sequence of bits.

2. The electronic device of claim 1, further comprising:
a second memory; and
a true random number generator interface configured to receive the first sequence of bits from a true random number generator and store the first sequence of bits to the second memory sequentially;
wherein the processor is configure to execute the at least one program for receiving the first sequence of bits from the second memory.

3. The electronic device of claim 1, wherein:
each of the plurality of binary numbers has M bits, wherein M is a positive integer;
a first binary number of the plurality of binary numbers has a value of 0;
a second binary number of the plurality of binary numbers has a value of k, wherein k is a positive integer smaller than $2^M$; and
a degree of the central angle formed by a first radius connecting to a first corresponding point of the first binary number and a second radius connecting to a second corresponding point of the second binary number is equal to $$\frac{k}{2^M} \times 360°.$$

4. The electronic device of claim 1, wherein in the first display image, the brightness of each chord of the plurality of chords is positive correlated to the number of times the chord is plotted, or the brightness of each chord of the plurality of chords is negative correlated to the number of times the chord is plotted.

5. The electronic device of claim 1, wherein:
the processor is configured to execute the at least one program for receiving a second sequence of bits and generating a second display image according to the second sequence of bits to show an entropy of the second sequence of bits;
when the entropy of the first sequence of bits is lower than the entropy of the second sequence of the bits, the first display image presents regular features more obviously than the second display image does; and
the regular features comprise at least one of the following features:
asymmetry, patterns, shapes, and spots distributed unevenly.

6. The electronic device of claim 1, further comprising a display device configured to display the first display image to show the entropy of the first sequence of bits.

7. The electronic device of claim 6, wherein as new binary numbers are added to the first sequence of bits, the processor is further configured to generate a series of display images showing chords connecting to corresponding points of the new binary numbers, and the display device is further configured to display a video stream formed by the series of display images.

8. An electronic device, comprising:
a data processing unit configured to:
receive a first sequence of bits;
divide the first sequence of bits into a plurality of binary numbers having a same number of bits;

determine a corresponding point for each of the plurality of binary numbers on a circumference of a circle according to a central angle positively correlated to a value of each of the plurality of binary numbers, wherein corresponding points of binary numbers having different values are located differently;

plot a plurality of chords in the circle in a first display image, wherein each of the plurality of chords connects corresponding points of two succeeding binary numbers in the plurality of binary numbers; and display the first display image to show a brightness of each chord of the plurality of chords correlated to a number of times the chord is plotted, wherein the brightness of each chord of the plurality of chords forms a brightness distribution signifying an entropy of the first sequence of bits; and a display device configured to display the first display image.

9. The electronic device of claim 8, further comprising:
a memory; and
a true random number generator interface configured to receive the first sequence of bits from a true random number generator and store the first sequence of bits to the memory sequentially;
wherein the data processing unit is configured to receive the first sequence of bits by reading data from the memory.

10. The electronic device of claim 9, further comprising the true random number generator configured to generate the first sequence of bits through a physical process.

11. The electronic device of claim 8, wherein:
each of the plurality of binary numbers has M bits, wherein M is a positive integer;
a first binary number of the plurality of binary numbers has a value of 0;
a second binary number of the plurality of binary numbers has a value of k, wherein k is a positive integer smaller than $2^M$; and
a degree of the central angle formed by a first radius connecting to a first corresponding point of the first binary number and a second radius connecting to a second corresponding point of the second binary number is equal to $$\frac{k}{2^M} \times 360°.$$

12. The electronic device of claim 8, wherein in the first display image, the brightness of each chord of the plurality of chords is positive correlated to the number of times the chord is plotted, or the brightness of each chord of the plurality of chords is negative correlated to the number of times the chord is plotted.

13. The electronic device of claim 8, wherein:
the data processing unit is further configured to receive a second sequence of bits and generate a second display image according to the second sequence of bits to show an entropy of the second sequence of bits;
when the entropy of the first sequence of bits is lower than the entropy of the second sequence of the bits, the first display image presents regular features more obviously than the second display image does; and the regular features comprise at least one of the following features:
asymmetry, patterns, shapes, and spots distributed unevenly.

14. The electronic device of claim 8, wherein as new binary numbers are added to the first sequence of bits, the data processing unit is further configured to generate a series of display images showing chords connecting to corresponding points of the new binary numbers, and the display device is further configured to display a video stream formed by the series of display images.

15. A method for visualizing an entropy of a sequence of bits, comprising:
receiving a first sequence of bits;
dividing the first sequence of bits into a plurality of binary numbers having a same number of bits;
determining a corresponding point for each of the plurality of binary numbers on a circumference of a circle according to a central angle positively correlated to a value of each of the plurality of binary numbers, wherein corresponding points of binary numbers having different values are located differently;
plotting a plurality of chords in the circle in a first display image, wherein each of the plurality of chords connects corresponding points of two succeeding binary numbers in the plurality of binary numbers; and
displaying the first display image to show a brightness of each chord of the plurality of chords correlated to a number of times the chord is plotted, wherein the brightness of each chord of the plurality of chords forms a brightness distribution signifying an entropy of the first sequence of bits.

16. The method of claim 15, further comprising:
generating, by a true random number generator, the first sequence of bits; and
storing, by a memory, the first sequence of bits.

17. The method of claim 15, wherein:
each of the plurality of binary numbers has M bits, wherein M is a positive integer;
a first binary number of the plurality of binary numbers has a value of 0;
a second binary number of the plurality of binary numbers has a value of k, wherein k is a positive integer smaller than $2^M$; and
a degree of the central angle formed by a first radius connecting to a first corresponding point of the first binary number and a second radius connecting to a second corresponding point of the second binary number is equal to $$\frac{k}{2^M} \times 360°.$$

18. The method of claim 15, wherein in the first display image, the brightness of each chord of the plurality of chords is positive correlated to the number of times the chord is plotted, or the brightness of each chord of the plurality of chords is negative correlated to the number of times the chord is plotted.

19. The method of claim 15, further comprising:
receiving a second sequence of bits; and
generating a second display image according to the second sequence of bits to show an entropy of the second sequence of bits;

wherein when the entropy of the first sequence of bits is lower than the entropy of the second sequence of the bits, the first display image presents regular features more obviously than the second display image does; and the regular features comprise at least one of the following features:

asymmetry, patterns, shapes, and spots distributed unevenly.

20. The method of claim 15, further comprising:

displaying, by a display device, the first display image.

* * * * *